Figure 5:
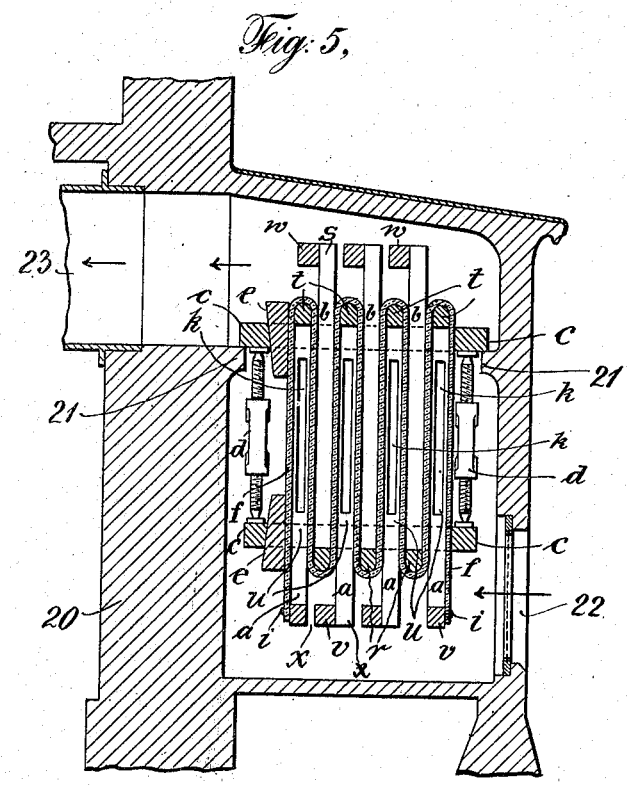

A. RAHE.
FILTER.
APPLICATION FILED DEC. 15, 1908.
930,561.
Patented Aug. 10, 1909.
2 SHEETS—SHEET 1.
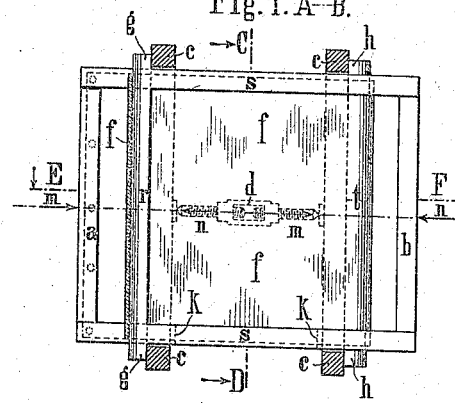
Fig. 1. A—B.
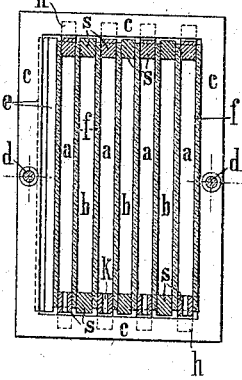
Fig. 3. C—D.
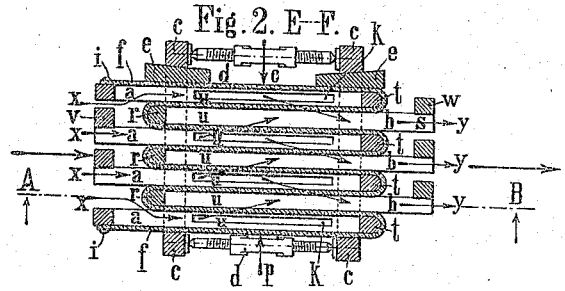
Fig. 2. E—F.
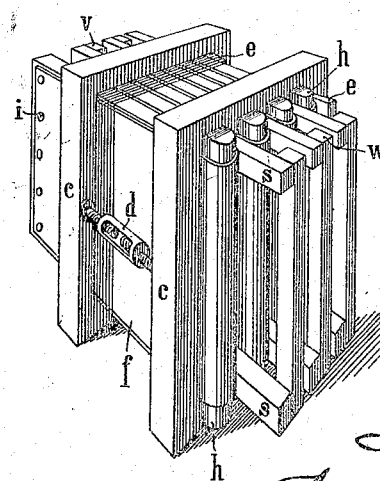
Fig. 4.

A. RAHE.
FILTER.
APPLICATION FILED DEC. 15, 1908.

930,561.

Patented Aug. 10, 1909.
2 SHEETS—SHEET 2.

UNITED STATES PATENT OFFICE.

AUGUST RAHE, OF BRACKWEDE, GERMANY, ASSIGNOR TO THE FIRM OF K. & TH. MÖLLER GESELLSCHAFT MIT BESCHRÄNKTER HAFTUNG, OF BRACKWEDE, GERMANY.

FILTER.

No. 930,561.  Specification of Letters Patent.  Patented Aug. 10, 1909.

Application filed December 15, 1908. Serial No. 467,594.

*To all whom it may concern:*

Be it known that I, AUGUST RAHE, a citizen of the German Empire, and resident of Brackwede, Province of Westphalia, Kingdom of Prussia, Empire of Germany, machinist, have invented certain new and useful Improvements in a Filter, of which the following is a specification.

This invention relates to filters of the type in which the fluid to be filtered is passed into filter pockets.

Filters constructed according to my invention are particularly applicable for filtering air which is used for cooling dynamos and similar electrical machinery, said electrical machinery being usually run at very high speeds by means of steam turbines.

In a filter constructed in accordance with the present invention a plurality of frames open at one end and closed at the other are arranged side by side, and the filter pockets are formed by a length of filtering fabric which is folded around each frame whereby a filter pocket is formed in each frame, in such a manner that each filter pocket is open at the open end of its frame and there is only one thickness of filtering fabric between the filter pockets of every two adjacent frames.

The filtering fabric is folded tightly around each frame and is fastened at its ends to the outer frames. The frames are adapted to be clamped more or less closely together and to be fixed in any desired relative position to one another.

The frames are arranged in two alternating series, the open ends of all the frames of one series being arranged at the inlet end of the filter, and the open ends of all the frames of the other series being arranged at the delivery end of the filter. Thus, the open end of each frame will be arranged adjacent to the closed end of the next frame, and inversely.

The frames are fixed and fastened together preferably by means of clamping bars which inclose the frames as a whole and which can be tightened up by suitable means such as a right and left hand screw coupling device.

A construction of apparatus embodying the improvements of this invention is illustrated by way of example in the accompanying drawings in which, Figure 1 is a section on the line A—B of Fig. 2; Fig. 2 is a section on the line E—F of Fig. 1; and Fig. 3 is a section on the line C—D of Fig. 1; Fig. 4 is a perspective view of the apparatus. Fig. 5 is an enlarged view of the filter similar to that shown in Fig. 2, showing also in cross section a suitable casing in which the filter is supported.

In these figures, *a*, *b* are a plurality of frames capable of adjustment relatively to one another. *f* is a filtering fabric of determined width and of any desired length. It is fastened at its ends, *i*, *i*, and is folded back and forth in folds, corrugations, or zigzag layers or the like around the series of frames *a*, *b* so as to form pockets *u* between the folds of the filtering fabric within the said frames.

The frames *a*, *b* of each pocket are closely surrounded by the filtering fabric *f* in such a manner that one thickness of filtering fabric serves as a filtering surface between every two adjacent pockets *u*.

The lower cross pieces of the frames *a* and *b* are formed with slots *k* which prevent an accumulation of dust within the frames. The frames *a* are open at the side, indicated by the arrow *x* for the admission of the fluid to be filtered, and the frames *b* are open at the side indicated by the arrow *y* for the delivery of the filtrate. Thus on the inlet end of the construction of filter shown in Fig. 2, the closed ends *r* of the frames *b* are located in the order of the even numbers of the total series of frames, and the open ends *x* of the frames *a* are located in the order of the odd numbers, while the reverse arrangement obtains at the outlet end of the filter where the open ends *y* of the frames *b* are located in the order of the even numbers, and the closed ends *t* of the frames *a* are located in the order of the odd numbers of the total series of frames.

It is preferred to arrange the cross pieces *v*, *w* on the outside of the frame longitudinals *s* (Figs. 2 and 4) at the open ends *x* and *y* of the frames *a*, *b* so that the inlet ends shall be completely open in the straight. In some constructions the cross pieces *v* and *w* may be dispensed with altogether.

For the purpose of simultaneously adjusting and fixing the frames relatively to one another, the frames *a* are provided with shoulders or stops *h* and the frames *b* are provided with shoulders or stops *g* (Figs. 1 and 4) against which frame clamps *c*, *c* can be shifted relatively to one another in the direction of the arrows *m*, *n* (Fig. 1) by means of an adjusting device such as a right and left hand screw coupling d.

The jointing of the frames against one another and of the interposed filtering fabric is effected in the example shown by means of wedges e, e, inserted between the frame clamps and the outermost frames a, and acting in the direction of the arrows o, p (Fig. 2). This jointing may however be effected by any other means.

In Fig. 5 is shown a suitable casing 20 in which the filter is suitably supported upon brackets 21, the casing being provided with suitable inlet and outlet passages 22 and 23 respectively.

What I claim is:

1. In a filter the combination of a length of filter fabric folded in a zigzag like manner, a frame within each zigzag pocket, means for displacing two adjacent frames toward each other in order to stretch the fabric, and means for securing frame and filter fabric in their stretched position, the ends of the fabric being secured.

2. In a filter the combination of a length of filter fabric folded in a zigzag like manner, a frame open at one end and closed at the other within each zigzag pocket, means for displacing two adjacent frames toward each other in order to stretch the fabric, and means for securing frame and filter fabric in their stretched position, the ends of the fabric being secured.

3. In a filter the combination of a length of filter fabric secured at each end and folded in a zigzag like manner, a frame within each zigzag pocket, extensions (g, h) on each frame against which the clamping device bears for displacing the frame toward each other.

4. In a filter the combination of a length of filter fabric secured at each end and folded in a zigzag like manner, a frame within each zigzag pocket, the borders of which at the entrance and exit are attached on the outside of the frame, means for displacing two adjacent frames toward each other in order to stretch the filter fabric and means for securing the frames and filter cloth in their stretched position.

5. A filter comprising a length of filter fabric folded in a zigzag like manner, a frame within each zigzag pocket, means for displacing two adjacent frames toward each other in order to stretch the fabric, and means for securing frame and filter fabric in their stretched position.

6. In a filter the combination of a plurality of frames open at one end and closed at the other arranged side by side with a length of filtering fabric fastened at its ends to the outer frames, and folded around each frame whereby a filter pocket is formed in each frame open at the open end of the said frame, clamps for holding the frames together and wedges for applying pressure through said clamps to said frames, as set forth.

In testimony whereof I have signed this specification in the presence of two subscribing witnesses.

AUGUST RAHE.

Witnesses:
HENRY HASPER,
WOLDEMAR HAUPT.